Patented Aug. 23, 1932

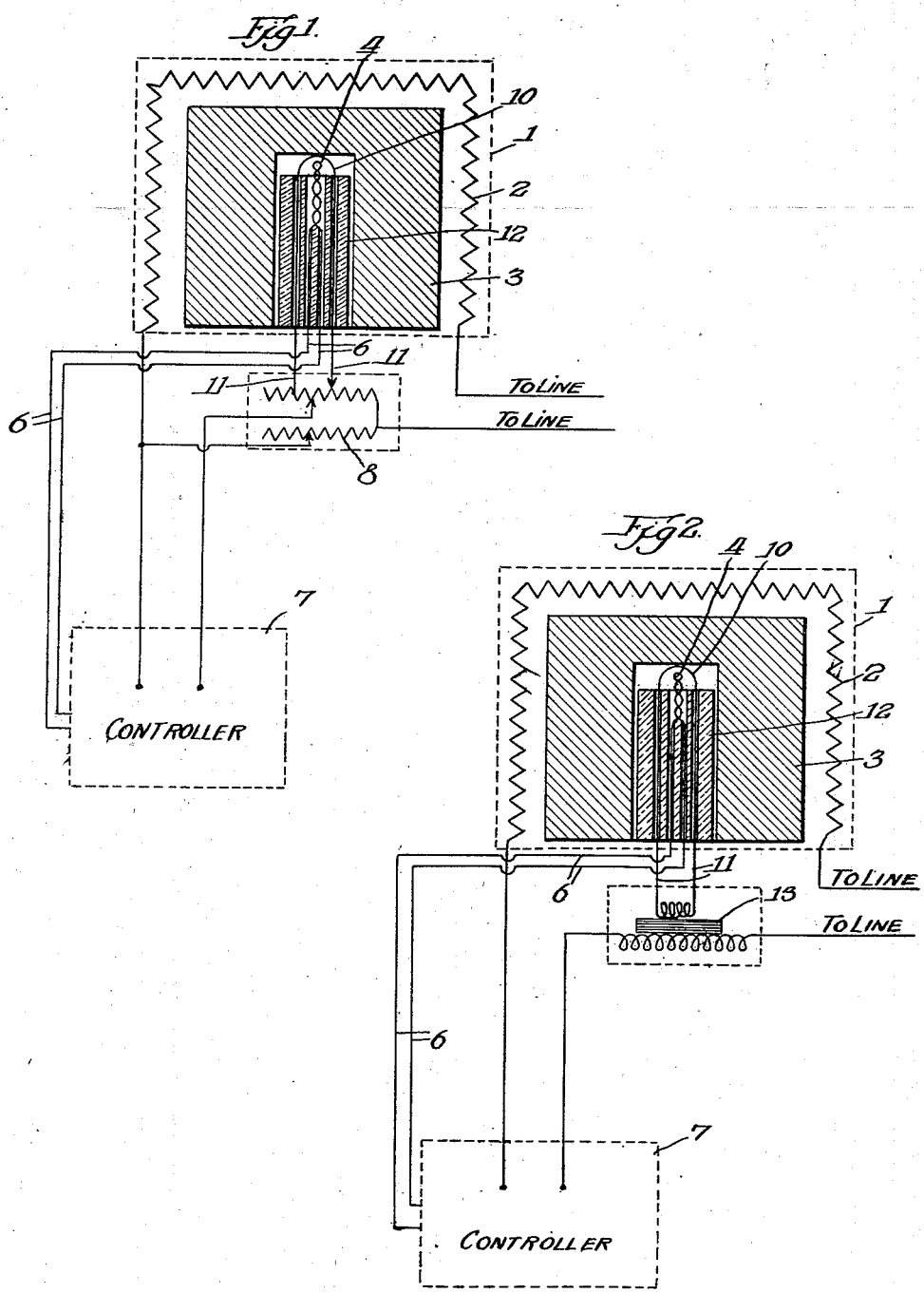

1,873,421

UNITED STATES PATENT OFFICE

JEROME J. KANTER, OF CHICAGO, ILLINOIS, ASSIGNOR TO CRANE CO., OF CHICAGO, ILLINOIS, A CORPORATION OF ILLINOIS

METHOD AND APPARATUS FOR CONTROLLING TEMPERATURES

Application filed March 22, 1930. Serial No. 438,075.

This invention relates to a method and apparatus for controlling the temperature of articles being heated and more particularly to maintaining the temperature of the heated articles constant over long periods.

It has been the practice in the past to maintain the temperature of an article being heated constant by controlling the source of heat in accordance with the temperature of the article. This was accomplished by placing a controlling element in heat conductive relation to the article being heated the element being utilized to actuate a controller which regulated the source of heat supplied to the article. As one example of such a system the temperature of furnaces have been maintained at a relatively constant value by means of a thermo-couple forming part of a pyrometer controller, the thermo-couple being placed in heat conductive relation to the article being heated in the furnace.

All prior systems however, and particularly those dependent upon the action of a thermo-couple have not been satisfactory in that they did not maintain the temperature constant within sufficiently close limits, the periodic variation being often as great as 20° Fahrenheit. This was due largely to the fact that the thermo-couple will not follow immediately and accurately the varying temperatures of the article being treated with a resultant lag in the regulation of the heat supply. Due to this lag the temperature of the furnace would rise considerably above the desired value before the supply of heat was reduced the required amount and correspondingly the temperature of the furnace would fall below the desired degree before the regulator or controller would function to increase the supply of heat.

Accordingly it is the purpose of this invention to provide a method and means of maintaining the temperature of the heated article substantially constant by eliminating any lag between the controlling device or devices and the periodic interruption of heat supply to the article being treated.

This is accomplished by providing what may be termed an auxiliary controlling device associated with the main controlling element to cause the main controlling element to follow very closely the interruption of heat supply to the article being heated. In order to obtain this control the auxiliary controller is caused to fluctuate in accordance with the interruptions of the heat supply and the variations of the temperature of the article being heated. The fluctuations of the auxiliary controller are brought about by means apart from the heat source to the article being heated. One convenient form of doing this is to utilize a portion of the heat source being supplied to the treated article, the portion used being a portion of the controlled heat source which will accordingly follow the variations in the temperature of the article.

A specific application of this invention for purposes of illustration will be given in connection with the drawing in which:

Fig. 1 is a schematic representation of an electrically heated furnace controlled and regulated in accordance with this invention.

Fig. 2 is a similar schematic representation of a slightly modified form showing a different manner of deriving current for the auxiliary heater.

Referring particularly to Fig. 1 there is illustrated an electrically heated furnace 1 which is heated by the usual resistance element 2 and within which is placed a sample or article 3 to be heated. The sample is bored to receive a thermo-couple 4 which is connected through wires 6 to a pyrometer controller 7. The thermo-couple and pyrometer controller are of standard construction, the thermo-couple functioning due to the difference in temperature between the temperature of the jointure and minimum temperatures in the circuit, to actuate the controller which in turn regulates the current supplied to the furnace. The controller, as can be noticed, is in series with the source of current supply to the heating element 2 of the furnace. One side of the supply line is shown as including a pair of resistance elements 8, the latter being a customary part of the usual controlling systems.

An auxiliary heating element 10 is placed in the sample 3 with a portion thereof lying adjacent the tip end of the thermo-couple, the latter end being the jointure of the two metals of the couple and having the temperature at which control is to be established. The auxiliary heating element 10 is tapped across a portion of one of the resistances by leads 11 from which it derives sufficient current to heat the element. The element 10 receiving its current from the source supplying the furnace which supply is regulated by the pyrometer controller, will vary in temperature in accordance with the fluctuations of the heating current. The fluctuating auxiliary heater will accordingly cause the temperature of the tip of the thermo-couple to vary in a corresponding manner. The thermo-couple and element are of course of slight mass relatively to the sample and to the main heating element of the furnace.

Were it not for the heating element, the thermo-couple would be heated solely by the surrounding sample which in turn is heated by the furnace. It is obvious that the thermo-couple being in the interior of the sample would lag in its reactions behind the actual change in temperature of the furnace and sample since the entire mass of the furnace and sample must first vary before the temperature of the thermo-couple can vary. This lag of the thermo-couple behind the furnace and sample will allow the furnace to become overheated or underheated according to the direction of variation before the controller which operates only in response to the thermo-couple will function to change the heating current.

With the use of the auxiliary heater, however, which is heated from a source apart from the heat source of the furnace and which fluctuates simultaneouly with the variations in the heat supply and similates the variations in temperature of the furnace and sample, the thermo-couple is caused to follow closely the fluctuations of the furnace and sample. This is due to the close proximity of the auxiliary heater element to the tip of the thermo-couple, the latter receiving varying amounts of heat from the fluctuating auxiliary heater.

In order to insulate the auxiliary heater from the thermo-couple and in order to keep the two properly spaced from each other, an insulating member 12 is provided having four spaced apertures therethrough permitting the passage of the two leads of the thermo-couple and the two leads of the auxiliary heater.

In Fig. 2 there is shown a slight modification of the application of this invention from that as shown in Fig. 1. In Fig. 2 the auxiliary heating element instead of being tapped across one of the resistances in the heating current supply line is connected to the secondary of a transformer 13 inserted in one leg of the supply line.

It follows from the above that due to the varying temperatures of the auxiliary heater which vary simultaneously with the changes in temperature of the heating element of the furnace and which similates the changes of the heating element of the furnace, the high temperature end of the thermo-couple will be caused to vary correspondingly without any lag. The additional heat imparted or transferred to the thermo-couple by the auxiliary heater will cause the thermo-couple to be heated slightly in advance of the sample i. e. the thermo-couple will reach its maximum temperature before the furnace reaches its maximum temperature. Consequently the controller for the supply current can function to regulate the furnace with negligible lag with regard to the actual temperature of the furnace. Accordingly the furnace and the sample will not be raised to a higher temperature than desired before the supply of current is reduced by the action of the controller and conversely upon a lowering of the temperature of the furnace the temperature will not be decreased below that desired before the controller functions to regulate the supply of current.

It is obvious that the illustrations given are mere applications of the principles and apparatus involved in carrying out the spirit of this invention and which may obviously be applied to control other sources of heat for other purposes than those shown. It is also apparent that various changes may be made in the details of construction of the illustrated apparatus without departing from the spirit and scope of this invention as defined in the claims appended hereto.

I claim:

1. In an apparatus for controlling the temperature of an electrically heated furnace, a thermo-couple in heat conductive relation to the article being heated in said furnace, a controller for regulating the current supplied to said furnace, said controller being operatively connected to said thermo-couple and an auxiliary heater for said thermo-couple, said auxiliary heater being heated by a source independent of the heat of the furnace, said independent source fluctuating in accordance with the variations in the current supplied to the furnace.

2. In an apparatus for controlling the temperature of an electrically heated furnace, a thermo-couple in heat conductive relation to the article being heated in said furnace, a controller for regulating the current supplied to said furnace, said controller being operatively connected to said thermo-couple and an auxiliary heater for said thermo-couple, said auxiliary heater being supplied with a portion of the current regulated by said controller.

3. In an apparatus for controlling the temperature of an electrically heated furnace, a thermo-couple in heat conductive relation to the article being heated in said furnace, a controller for regulating the current supplied to said furnace, said controller being operatively connected to said thermocouple and an auxiliary heater for said thermo-couple, said auxiliary heater comprising a resistance heater permanently connected to the controlled current whereby the temperature of the auxiliary heater fluctuates in accordance with the varying current for the furnace.

4. The method of controlling the temperature of an article being heated which comprises controlling the heat supplied to the article partially by the effect of the temperature of the article being heated upon a temperature responsive device in heat conductive relation to the article being heated and partially by the temperature of an independent and varying auxiliary source of heat constantly applied to the temperature responsive device said auxiliary source varying in accordance with variations in the heat supplied.

5. The method of controlling the temperature of an article being heated which comprises controlling the supply of heat to the article partially by a thermo-couple in heat conductive relation thereto and partially by an auxiliary source of heat in heat conductive relation to the thermo-couple and constantly applied to said thermo-couple during heating of said article.

6. The method of maintaining the temperature constant of an article being heated which comprises partially controlling the supply of heat in accordance with the temperature of the heated article by a temperature controlling device and subjecting the controlling device to an auxiliary source of heat fluctuating in intensity in accordance with variations in the heat supply.

7. The method of maintaining the temperature constant of an article being heated which comprises partially controlling the supply of heat in accordance with the temperature of the heated article by a thermo-couple in heat conductive relation to the article being heated and subjecting the thermo-couple to a continuous auxiliary source of heat fluctuating in accordance with variations in the source of heat supply.

8. The method of maintaining the temperature of a heated article constant which comprises partially controlling the source of heat by and in accordance with the temperature of the article being heated and constantly applying a portion of the controlled heat energy to the controlling means as an auxiliary independent heating means.

9. The method of controlling the temperature of a furnace which comprises partially regulating the source of heat supply to said furnace in accordance with the temperature of the contents of the furnace and utilizing the fluctuations of the controlled source of heat supply to partially control the temperature of the furnace.

10. The method of controlling the temperature of an electric resistance furnace which comprises partially regulating the heating current supplied to the furnace in accordance with the temperature of the contents of the furnace and utilizing the fluctuations of the regulated current supply to partially regulate the heating current.

11. The method of controlling the temperature of an electric furnace which comprises partially regulating the supply of heating current to the furnace in accordance with the temperature of the contents of the furnace, utilizing the heating current to continuously heat an auxiliary heater to varying temperatures which vary in accordance with the fluctuating heating current and transferring the fluctuating heat from the auxiliary heater to the regulator of the current supply.

12. The method of controlling the temperature of an electric furnace which comprises partially regulating the supply of heating current to the furnace by a thermo-couple in accordance with the temperature of the contents of the furnace, utilizing the current to continuously heat an auxiliary heater to temperatures varying in accordance with the fluctuating heating current and transferring the varying heat from the auxiliary heater to the thermo-couple.

13. In an apparatus for controlling the temperature of heated article, a controller actuated in accordance with the temperature of the article being heated and arranged to regulate the amount of heat supplied to the article partly in response to the temperature of the article and an auxiliary heater continuously energized by the regulated source of heat supply and arranged to follow the fluctuations of the regulated source of heat, said controller and auxiliary heater being associated to further effect the source of heat supply partly in response to the temperature of said auxiliary heater to cause the controller to follow more closely variations in temperature of the heated article.

14. In an apparatus for controlling the temperature of a heated article, a controller in heat conductive relation to the article being heated for controlling the source of heat supply to the article partly in response to the temperature of the article, and an auxiliary heater comprising an independent source of heat fluctuating in accordance with the variations in the controlled source of heat supply and disposed in heat conductive relation to the controller partly in response to the temperature of said auxiliary heater to cause the controller to follow more closely variations in temperature of the heated article.

15. In an apparatus for controlling the temperature of a heated article, a thermocouple in heat conductive relation to the article being heated for controlling the heat supplied to the article being heated partially in response to the temperature of the article, an auxiliary heater in heat conductive relation to said thermo-couple and means independent of the heat supplied to the article for continuously heating said auxiliary heater to temperatures varying in accordance with fluctuations in the source of heat supply for the article being heated to further affect the control of the heat supplied.

16. In an apparatus for controlling the temperature of an electrically heated furnace, a controlling element adapted to be placed in heat conductive relation to the article being heated in the furnace, connections between said controlling element and the source of current for said furnace and an auxiliary heater in heat conductive relation to said controlling element for imparting heat thereto, said auxiliary heater being continuously supplied with heat from a source varying in accordance with the fluctuations of said source of current independently of the heat of the article being treated.

In witness of the foregoing I affix my signature.

JEROME J. KANTER.